US009942533B2

(12) United States Patent
Sathish

(10) Patent No.: US 9,942,533 B2
(45) Date of Patent: Apr. 10, 2018

(54) METHOD AND APPARATUS FOR GENERATING MULTI-CHANNEL VIDEO

(75) Inventor: Sailesh Kumar Sathish, Tampere (FI)

(73) Assignee: Provenance Asset Group LLC, Essex, CT (US)

( * ) Notice: Subject to any disclaimer, the term of this patent is extended or adjusted under 35 U.S.C. 154(b) by 756 days.

(21) Appl. No.: 13/310,415

(22) Filed: Dec. 2, 2011

(65) Prior Publication Data

US 2013/0141529 A1 Jun. 6, 2013

(51) Int. Cl.

| | |
|---|---|
| ***H04N 13/02*** | (2006.01) |
| ***H04N 13/00*** | (2018.01) |
| ***H04N 21/2343*** | (2011.01) |
| ***H04N 21/2365*** | (2011.01) |
| ***H04N 21/2743*** | (2011.01) |
| ***H04N 21/414*** | (2011.01) |
| ***H04N 21/81*** | (2011.01) |
| ***H04N 21/8547*** | (2011.01) |

(52) U.S. Cl.

CPC ..... *H04N 13/0048* (2013.01); *H04N 13/0051* (2013.01); *H04N 13/0059* (2013.01); *H04N 13/0066* (2013.01); *H04N 21/2343* (2013.01); *H04N 21/2365* (2013.01); *H04N 21/2743* (2013.01); *H04N 21/41407* (2013.01); *H04N 21/816* (2013.01); *H04N 21/8547* (2013.01)

(58) Field of Classification Search

CPC ....................... H04N 21/2365; H04N 13/0048
USPC ........................................................... 348/43
See application file for complete search history.

(56) References Cited

U.S. PATENT DOCUMENTS

| | | | | |
|---|---|---|---|---|
| 2004/0031049 | A1 | 2/2004 | Suzuki et al. | |
| 2004/0119815 | A1 | 6/2004 | Soloff | |
| 2005/0165795 | A1 | 7/2005 | Myka et al. | |
| 2007/0021058 | A1* | 1/2007 | Arseneau et al. | 455/3.06 |
| 2009/0276531 | A1 | 11/2009 | Myka et al. | |
| 2010/0171834 | A1* | 7/2010 | Blumenfeld | 348/159 |
| 2011/0058036 | A1 | 3/2011 | Metzger et al. | |
| 2011/0117934 | A1 | 5/2011 | Mate et al. | |
| 2011/0285809 | A1* | 11/2011 | Feng | G06K 9/00234 348/14.16 |
| 2012/0059826 | A1* | 3/2012 | Mate | G06F 17/30843 707/737 |
| 2012/0060077 | A1 | 3/2012 | Mate et al. | |
| 2012/0069131 | A1* | 3/2012 | Abelow | G06Q 10/067 348/14.01 |

OTHER PUBLICATIONS

International Search Report for related International Patent Application No. PCT/FI2012/051134 dated Feb. 26, 2013, pp. 1-4.

(Continued)

*Primary Examiner* — Jonathan Messmore
(74) *Attorney, Agent, or Firm* — Dinsmore & Shohl LLP

(57) ABSTRACT

An approach is provided for generating multi-channel video. A media platform segments a plurality of media items into one or more media segments based on a plurality of viewpoints of at least one event. The media platform then generates a plurality of media channels for respective one or more plurality of viewpoints. The plurality of media channels compiles the one or more media segments that depict the respective one or more of the plurality of viewpoints. The media platform then compiles the plurality of media channels into a multi-channel media item.

18 Claims, 9 Drawing Sheets

(56) References Cited

OTHER PUBLICATIONS

Written Opinion for related International Patent Application No. PCT/FI2012/051134 dated Feb. 26, 2013, pp. 1-8.
Content based analysis of digital video (Multi-Segment video indexing), http://books.google.fi/books?id=PBqJqWYgaygC&pg=PA129&lpg=PA129&dq=multi+segment+video&source Accessed: May 9, 2012.
World Wide Web Consortium standardization activity on media fragments, http://www.w3.org/2008/WebVideo/Fragments/WD-media-fragments-spec/#naming-track, Accessed: Mar. 28, 2012.

* cited by examiner

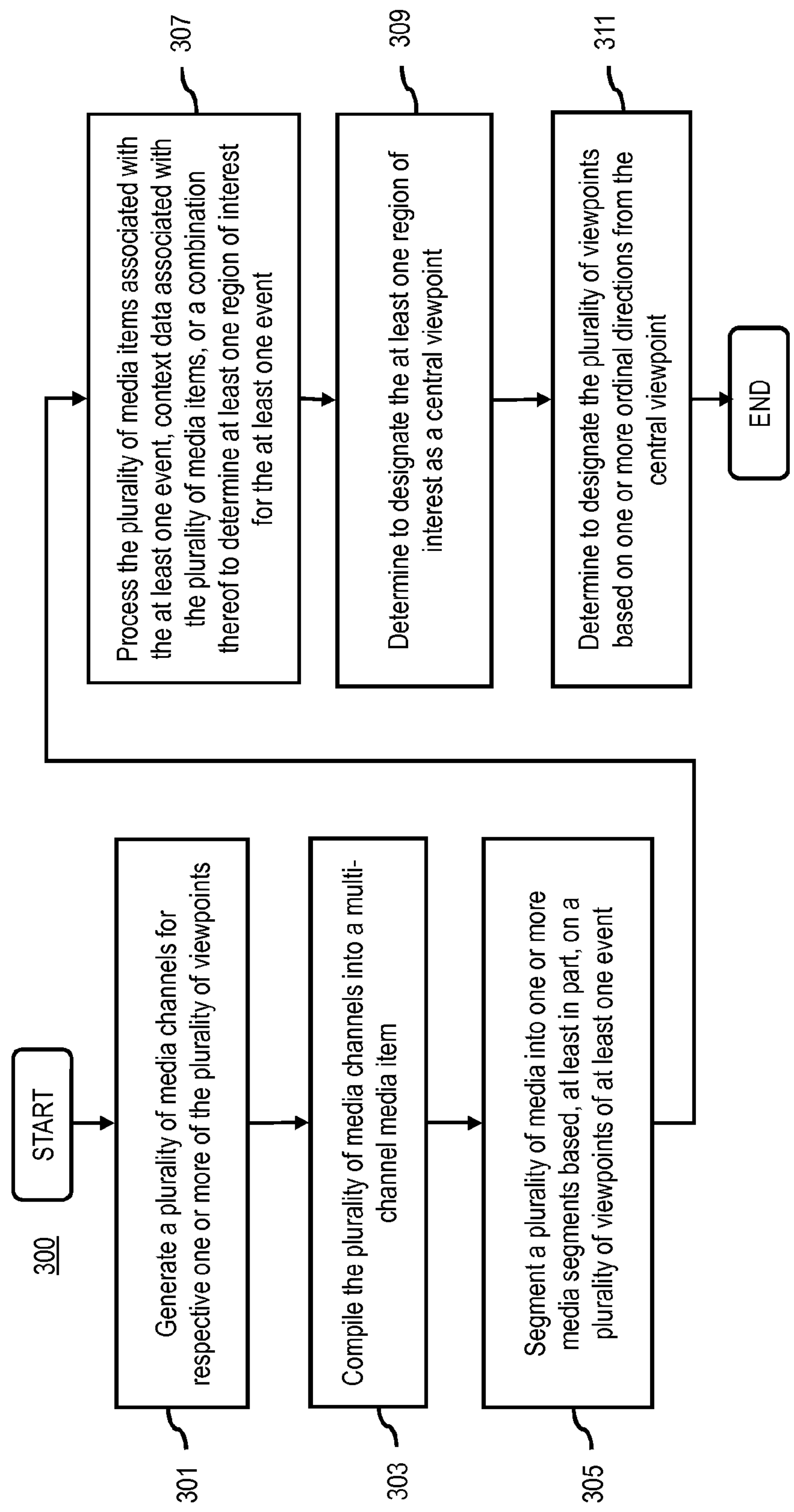
FIG. 3
300
START
Generate a plurality of media channels for respective one or more of the plurality of viewpoints
301
Compile the plurality of media channels into a multi-channel media item
303
Segment a plurality of media into one or more media segments based, at least in part, on a plurality of viewpoints of at least one event
305
Process the plurality of media items associated with the at least one event, context data associated with the plurality of media items, or a combination thereof to determine at least one region of interest for the at least one event
307
Determine to designate the at least one region of interest as a central viewpoint
309
Determine to designate the plurality of viewpoints based on one or more ordinal directions from the central viewpoint
311
END

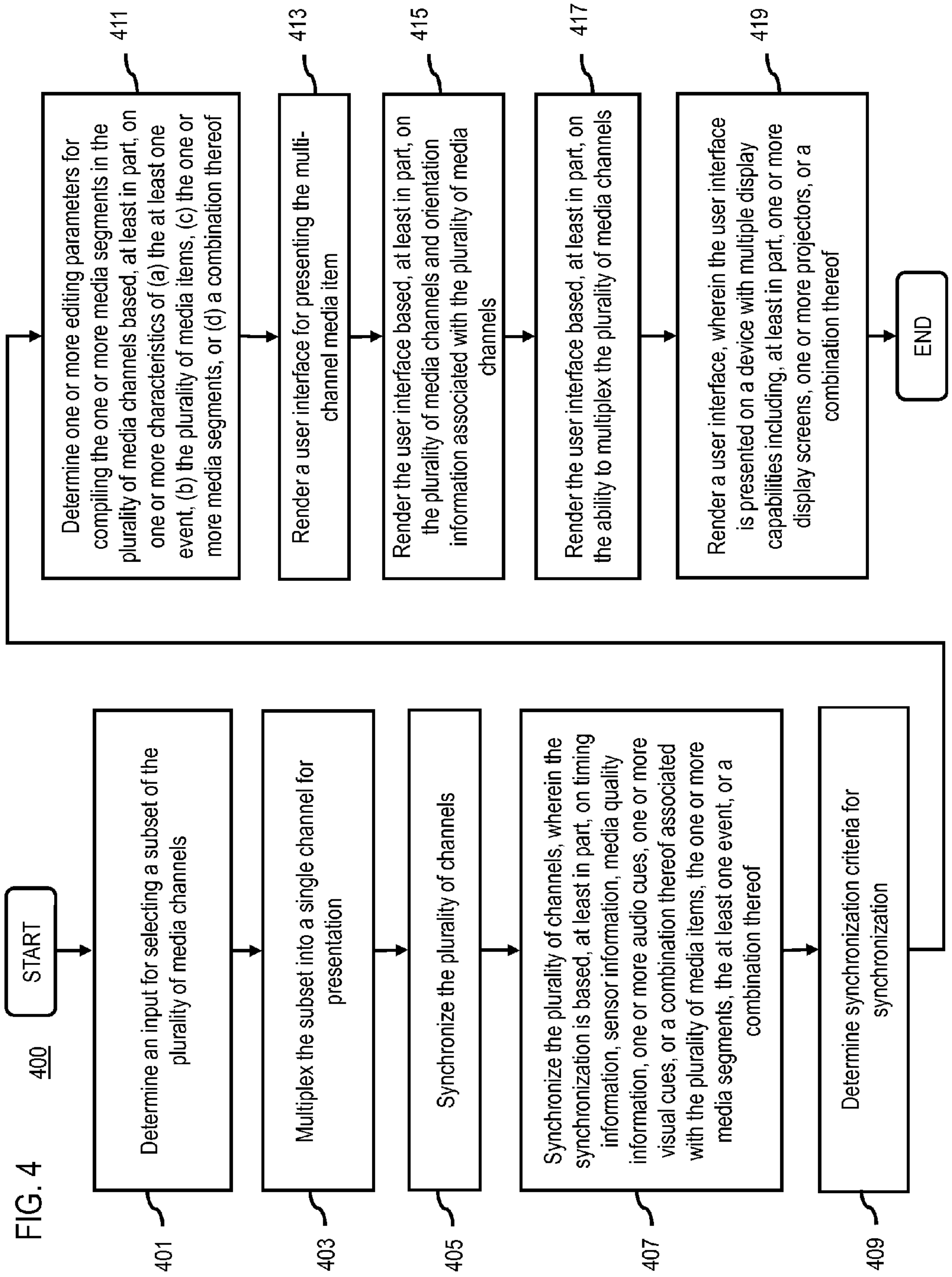
FIG. 4
400
START
Determine an input for selecting a subset of the plurality of media channels
401
Multiplex the subset into a single channel for presentation
403
Synchronize the plurality of channels
405
Synchronize the plurality of channels, wherein the synchronization is based, at least in part, on timing information, sensor information, media quality information, one or more audio cues, one or more visual cues, or a combination thereof associated with the plurality of media items, the one or more media segments, the at least one event, or a combination thereof
407
Determine synchronization criteria for synchronization
409
Determine one or more editing parameters for compiling the one or more media segments in the plurality of media channels based, at least in part, on one or more characteristics of (a) the at least one event, (b) the plurality of media items, (c) the one or more media segments, or (d) a combination thereof
411
Render a user interface for presenting the multi-channel media item
413
Render the user interface based, at least in part, on the plurality of media channels and orientation information associated with the plurality of media channels
415
Render the user interface based, at least in part, on the ability to multiplex the plurality of media channels
417
Render a user interface, wherein the user interface is presented on a device with multiple display capabilities including, at least in part, one or more display screens, one or more projectors, or a combination thereof
419
END MOBILE TERMINAL
801
817
835
821
Duplexer
837
LNA
819
PA
833
839
Down-
Converter
Synthesizer
Up-
Converter
831
Battery Interface
&
Power Control
820
841
Demodulator
RF
Interface
Modulator
827
829
815
825
Equalizer
847
Keyboard
807
Display
849
SIM Card
805
DSP
MCU
803
ASIC BACKPLANE
843
AUDIO
INTERFACE
CODEC
DAC
ADC
845
811
813
823
809
MEMORY
851

METHOD AND APPARATUS FOR GENERATING MULTI-CHANNEL VIDEO

BACKGROUND

Service providers and device manufacturers (e.g., wireless, cellular, etc.) are continually challenged to deliver value and convenience to consumers by, for example, providing compelling network services. Important differentiators in the industry are application and network services that offer users entertainment (e.g., media) and location services. In particular, media sharing services allow for distribution of content to other users of the media sharing services. Traditionally, the content distributed on such media sharing services is uploaded by one or more users. Interesting transformations of the content can be utilized to improve user experience. By way of example, extensive research and development has led to the creation of high-fidelity multi-channel audio presentations (e.g., surround sound). However, similar developments have not yet been applied to video largely due to technical challenges and limitations that exist for enabling such transformations. Therefore, service providers and device manufacturers face significant technical challenges in providing a service that allows consumers to experience full-fidelity multi-channel video presentations.

Some Example Embodiments

Therefore, there is a need for an approach for generating multi-channel video.

According to one embodiment, a method comprises causing, at least in part, a generation of a plurality of media channels for respective one or more of the plurality of viewpoints, wherein the plurality of media channels compile one or more media segment that depict the respective one or more of the plurality of viewpoints. The method also comprises causing, at least in part, a compilation of the plurality of media channels into a multi-channel media item.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a generation of a plurality of media channels for respective one or more of the plurality of viewpoints, wherein the plurality of media channels compile one or more media segment that depict the respective one or more of the plurality of viewpoints. The apparatus is also caused to cause, at least in part, a compilation of the plurality of media channels into a multi-channel media item.

According to another embodiment, a computer-readable storage medium carries one or more sequences of one or more instructions which, when executed by one or more processors, cause, at least in part, an apparatus to cause, at least in part, a generation of a plurality of media channels for respective one or more of the plurality of viewpoints, wherein the plurality of media channels compile one or more media segment that depict the respective one or more of the plurality of viewpoints. The apparatus is also caused to cause, at least in part, a compilation of the plurality of media channels into a multi-channel media item.

According to another embodiment, an apparatus comprises means for causing, at least in part, a generation of a plurality of media channels for respective one or more of the plurality of viewpoints, wherein the plurality of media channels compile one or more media segment that depict the respective one or more of the plurality of viewpoints. The apparatus also comprises means for causing, at least in part, a compilation of the plurality of media channels into a multi-channel media item.

According to one embodiment, a method comprises causing, at least in part, a rendering of a user interface for presenting the multi-channel media item. The method also comprises causing, at least in part, a rendering of the user interface based, at least in part, on the plurality of media channels and orientation information associated with the plurality of media channels. The method further comprises causing, at least in part, a rendering of the user interface based, at least in part, on the ability to multiplex the plurality of media channels.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a rendering of a user interface for presenting the multi-channel media item. The apparatus is also caused to cause, at least in part, a rendering of the user interface based, at least in part, on the plurality of media channels and orientation information associated with the plurality of media channels. The apparatus is further caused to cause, at least in part, a rendering of the user interface based, at least in part, on the ability to multiplex the plurality of media channels.

According to another embodiment, a computer-readable storage medium carries one or more sequences of one or more instructions which, when executed by one or more processors, cause, at least in part, an apparatus to cause, at least in part, a rendering of a user interface for presenting the multi-channel media item. The apparatus is also caused to cause, at least in part, a rendering of the user interface based, at least in part, on the plurality of media channels and orientation information associated with the plurality of media channels. The apparatus is further caused to cause, at least in part, a rendering of the user interface based, at least in part, on the ability to multiplex the plurality of media channels.

According to another embodiment, an apparatus comprises means for causing, at least in part, a rendering of a user interface for presenting the multi-channel media item. The apparatus also comprises means for causing, at least in part, a rendering of the user interface based, at least in part, on the plurality of media channels and orientation information associated with the plurality of media channels. The apparatus further comprises means for causing, at least in part, a rendering of the user interface based, at least in part, on the ability to multiplex the plurality of media channels.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3 and 4 are flowcharts of processes for generating multi-channel video, according to one example embodiment;

DESCRIPTION OF SOME EMBODIMENTS

Examples of a method, apparatus, and computer program for generating multi-channel video are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, structures and devices are shown in block diagram form in order to avoid unnecessarily obscuring the embodiments of the invention.

Figure 1:
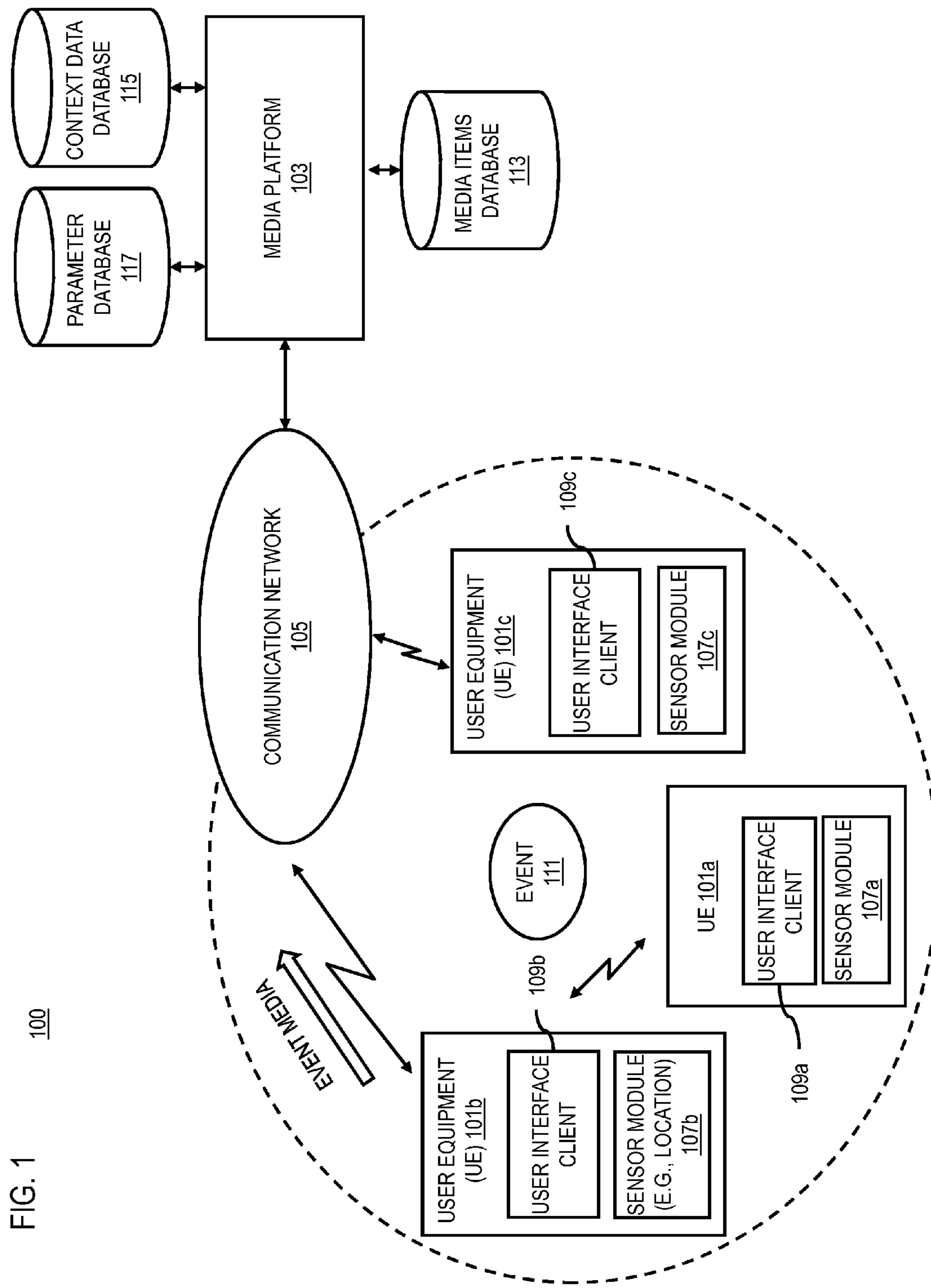
FIG. 1 is a diagram of a system capable of generating multi-channel video, according to one example embodiment.

FIG. 1 is a diagram of a system capable of generating multi-channel video, according to one example embodiment of the invention. In a mobile world, an increasing number of services and applications are targeted at providing social services and distributing media (e.g., video) captured by individual users using their own recording devices (e.g., mobile phones). As such, advances in mobile multimedia technology have given rise to significant increases in user generated content. By way of example, users can now readily share their own content with other using one or more social network services platforms (e.g., FACEBOOK®, YOUTUBE®, etc.).

Individual users commonly record media or media files (e.g., video, audio, images, etc.) at events that the users find interesting. Examples of events include concerts, cultural events, product releases, and the like. Moreover, events often have one or more focus points (e.g., a front stage, a left stage, and a right stage) and can be attended by more than one person. Many events are recorded by more than one user using one or more personal recording devices (e.g., a mobile phone, a camcorder, a digital camera, etc.). In addition, modern recording devices are also equipped with sensors that capture various context information such as angle of capture, tilt of capture, location data, acceleration (movement of camera) etc. Such information is also provided along with the captured media by the recording device. Various users may wish to share and view the recorded media of the events. Similar to multi-channel surround sound presentations, users may also wish to view different views of an event in an attempt to create a full-fidelity and/or immersive video experience of the event. However, the multi-channel developments associated with audio have not yet been consistently applied to video largely due to technical challenges and limitations that exist for enabling such transformations.

To address this problem, a system 100 of FIG. 1 introduces the capability to generate multi-channel video. According to one example embodiment, the system 100 first determines a plurality of media (e.g., videos) taken by a plurality of users throughout the course of at least one event (e.g., a concert) using one or more personal recording devices and later uploaded by the users to one or more services that are capable of processing and storing the plurality of media. By way of example, an event (e.g., a concert) may have a center stage (Side "A"), a left stage (Side "B"), and a right stage (Side "C") and/or the users may have a front view of the stage, a left view of the stage, and a right view of the stage based on the orientations of the users. In this instance, Side "A", Side "B", and Side "C" represent a plurality of potential viewpoints or areas of interest of the event. The viewpoints or areas of interest could also reference one or more ordinal directions (e.g., left, right, up, down, front, back, etc.). In one example embodiment, the system 100 can utilize a focus point analysis to determine the viewpoints or areas of interest, wherein multiple viewpoints are determined based on groupings of multiple focus points.

In one example, throughout the course of an event (e.g., a concert) users will capture a plurality of media (e.g., a video) of the event. Because Side "A" represents the center stage, many of the media items of the event will have been focused on Side "A" of the event. However, the same and/or different users will also likely capture media of the event relating to Sides "B" and "C" as well. The system 100 then determines context data (e.g., metadata) associated with the uploaded media to segment the plurality of media items into one or more media segments based on the respective viewpoints or areas of interest of the event (e.g., Side "A", Side "B", and Side "C"). By way of example, the context data can be generated by one or more sensors built-in to the personal recording devices used by the users to capture the video of the event (e.g., an orientation sensor, an accelerometer, a timing sensor, a global position system (GPS), an electronic compass, etc.). The context data is used by the system 100 to determine the viewpoints of the users (i.e., the one or more directions the users were pointing their recording devices during the event) and to determine at least one region of interest (ROI) for the event (e.g., Side "A"). In one example embodiment, the system 100 determines the region of interest by analyzing the plurality of media items to determine the region or viewpoint of the event a majority of the users focused on with their recording devices (e.g., Side "A"). In another example embodiment, the system 100 may determine the region of interest by analyzing the areas of visual or audio overlap among the plurality of recorded media. By way of example, in the example of the stage setting (Side "A", Side "B", and Side "C"), a user recording events happening on Side "B" is likely to also capture events happening on Side "A". Likewise, a user capturing events on Side "C" is also likely to capture events happing on Side "A". Therefore, the system 100 may determine that the area of overlap among the Side "B" and Side "C" media, Side "A", is the region of interest. In one embodiment, the system 100 utilizes the region of interest as a reference point to further segment the plurality of media items based on whether the viewpoint of the media refers to Side "A", Side "B", or Side "C". In one example, the system 100 also performs a quality analysis of the one or more media segments by using, for example, accelerometer information for shake detection and image quality determinations, audio analysis for audio quality determinations, and so forth. The system 100 can also further qualify the one or more media segments based on these quality parameters.

In one example embodiment, rather than combining the one or more media segments associated with Sides "A", "B", and "C" into a single stream or file, the system 100 generates a plurality of media channels (e.g., video channels or video streams) for each viewpoint of the event (e.g., Side "A", Side "B", and Side "C"), and then compiles the one or more media segments that depict each viewpoint into the respective media channels. [0001] Moreover, the number, position, and size of the viewpoints represented by the plurality of media channels may change during the presentation of the multi-channel media item because the focus points and/or viewpoints of the captured media items may change during an event. In one example embodiment, the system 100 can also generate multiple media channels corresponding to multiple events.

In one embodiment, the system 100 first determines a first frame for each media segment, which can be based on either timing information associated with the media segment or, when applicable, on audio information associated with the media segment depending on the event. In one embodiment, once the system 100 determines the first frame for each media segment, the system 100 automatically edits the media within each media channel based on one or more defined parameters. More specifically, the editing parameters are determined by the system 100 based on one or more characteristics related to the event, the plurality of media items, the one or more media segments, or a combination thereof. By way of example, for a music event (e.g., a concert), the parameters may include beats per minute (bpm) of an audio portion of the one or more media segments, quality of the one or more media segments available, quality of the audio channels associated with the one or more media segments, significant events happening within a particular viewpoint (e.g., Side "A"), length of the one or more media segments, and so forth. In one example embodiment, the system 100 can optionally determine to substitute one or more media segments within a media channel with one or more other media segments from the same user or a different user if the one or more media segments fall outside a threshold value associated with the one or more parameters.

In one example embodiment, the system 100 causes a synchronization of the plurality of media channels and then generates a multi-channel media item (e.g., a multi-channel video) based, at least in part, on the synchronization of the media channels. In one example, the system 100 can generate each media channel based on different synchronization criteria, however, in most cases, the media channels begin and end at the same time. By way of example, in one multi-channel media item (e.g., a multi-channel video) the channels representing Side "A", Side "B", and Side "C" may all start at the same time, but the channels representing Side "B" and Side "C" may terminate before the Side "A" thereby emphasizing the importance of Side "A" relative to the event. In one embodiment, the system 100 can synchronize the plurality of media channels (e.g., "A", "B", and "C") based on the same set of parameters that the system 100 used to synchronize the one or more media segments within the media channels. By way of example, the system 100 can determine to synchronize the plurality of channels based on timing information, sensor information, media quality information, one or more audio cues, one or more visual cues, or a combination thereof associated with the plurality of the media items, the one or more media segments, the at least one event, or a combination thereof. As a result, the system 100 can render each media channel of the multi-channel media item (e.g., a multi-channel video) separately on respective display screens and therefore present the multi-channel media item to one or more users as a full-fidelity and/or immersive representation of the event.

In one embodiment, the system 100 further processes the multi-channel media item to generate a synchronization channel between the plurality of media channels to enable a user, a media player, or a combination thereof to display the multi-channel media item as a single channel media item. More specifically, the system 100 causes a multiplexing of a subset of the media channels into a single channel, which in one example, is called a track synchronization and multiplexed (mux) channel. In one embodiment, the system 100 can utilize the track synchronization and mux channel in order to replace one or more media segments within a single media channel to attempt to present to one or more users a full-fidelity and/or immersive experience despite the traditional limitations of single channel media. By way of example, the system 100 could present media segments from channels “A”, “B”, “A”, “C”, “A”, which represent a user panning from left to right at the event, and/or the track synchronization and mux channel.

Figure 5:
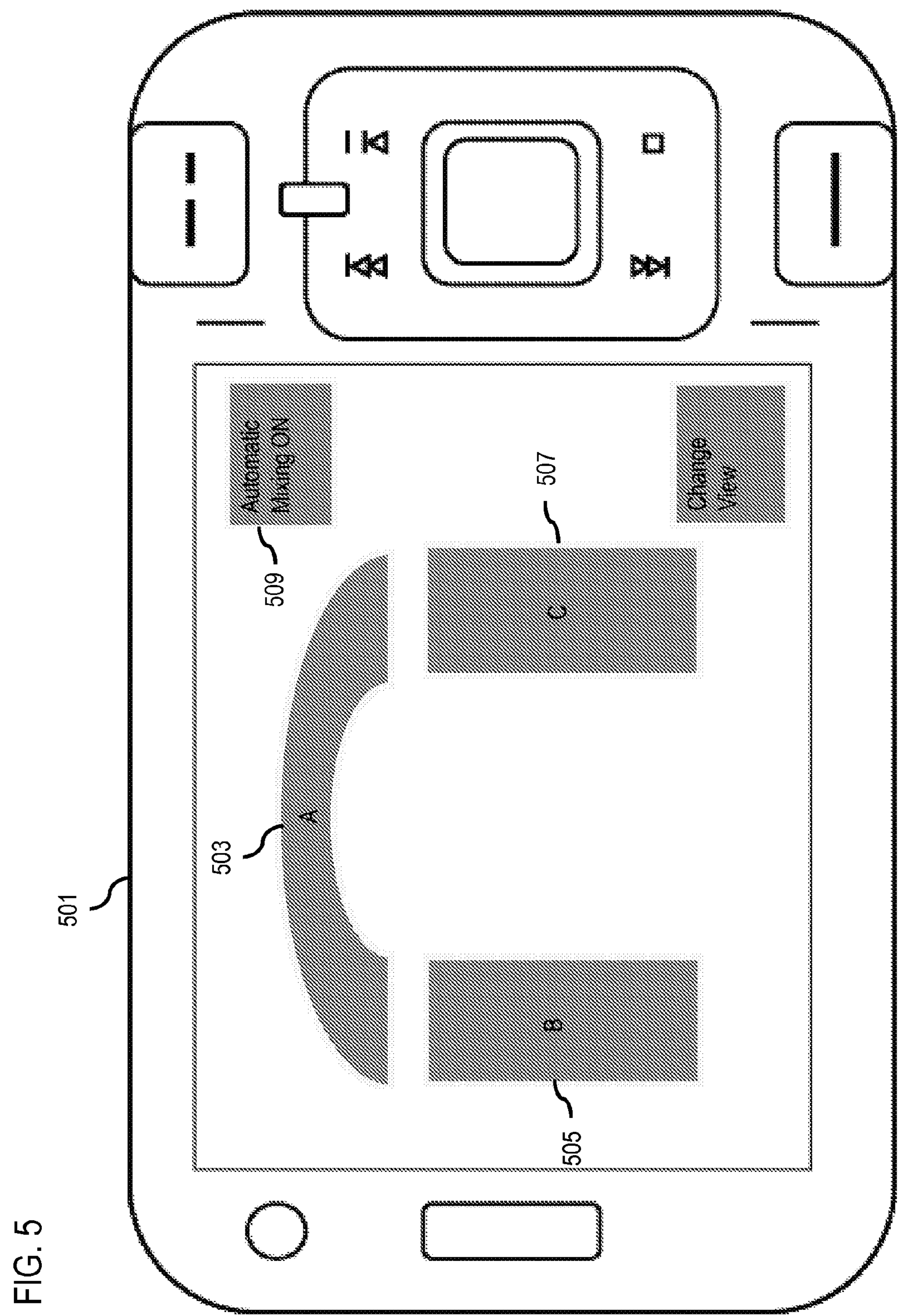
FIG. 5 is a diagram of a user interface utilized in the processes of FIGS. 3 and 4, according to various example embodiments.

As previously discussed, in an exemplary embodiment, the system 100 presents the plurality of media channels on respective displays to generate a full-fidelity and/or immersive experience for one or more users. However, in certain situations, multiple screens are unavailable (e.g., viewing a multi-channel media item on a mobile device). By way of example, when the system 100 determines to present the multi-channel media item and/or user interface (UI) on a single two-dimensional display screen, the system 100 presents a user with the option to choose among the plurality of media channels (e.g. “A”, “B”, and “C”) to display. Moreover, in this instance, the system 100 then causes a rendering of a user interface (UI) that is base on orientation information and the number of media channels available for playback. More specifically, the UI rendered by the system 100 includes one or more user interface elements representing respective viewpoints and/or media channels for presentation and/or playback. In one embodiment, the two-dimensional UI can also be used as a remote control to cause the system 100 to present and/or playback the multi-channel media item on multiple display screens. In one embodiment, the system 100 renders the user interface elements in an arrangement according to the respective viewpoints of the event. An illustrative example of a two-dimensional user interface is shown in FIG. 5.

In one example embodiment, when the system 100 determines to present the multi-channel media item and/or user interface (UI) on a three-dimensional display, the system 100 causes a rendering of a user interface that can include one or more objects with facets associated with the respective one or more user interface elements, one or more media channels, or a combination thereof. By way example, the system 100 can determine to render a user interface consisting of a cube for a multi-channel media item consisting of six media channels, a pyramid for a multi-channel media item consisting of five media channels, or an object determined by a user based on the same concept of associating a facet of the object with a viewpoint and/or media channel. In this example, a user can use a gesture on the facet of the cube interface to cause the system 100 to rotate the UI and/or select one or more corresponding media channels to present and/or playback. In another example, a user can use a split gesture to cause the system 100 to combine two or more facets of the UI (e.g. a cube) to create two more presentations of different media channels on the same screen. Further, a select and combinational gesture by a user can cause the system 100 to combine two or more channels into a single media channel. Again, the three-dimensional UI can also be used as a remote control to cause the system 100 to present and/or playback the multi-channel media item on single display screen, or simultaneously on multiple display screens.

In another embodiment, the system 100 renders a user interface for presenting the multi-channel media item (e.g., a multi-channel video) on a mobile device (e.g., a pico projector). In one example the mobile device may be equipped with multiple projecting lenses and/or pico projectors (e.g., three projecting lenses corresponding to media channels “A”, “B”, and “C”). By way of example, a user can utilize the system 100 to create a full-fidelity and/or immersive experience by putting the mobile device being used for projection inside a box or small room and then projecting the multi-channel media item on the sides of the box or onto the walls of the room.

As shown in FIG. 1, the system 100 comprises one or more user equipment (UEs) 101*a*-101*c* (also collectively referred to as the UEs 101) containing a user interface client 109*a*-109*c* (also collectively referred to as user interface client 109) having connectivity to a media platform 103 via a communication network 105. In one example embodiment, the UEs 101 are used to capture media items/files (e.g., videos, photos, audio, etc.) at an event 111 (e.g., a concert) and then transmit the plurality of media items (e.g., videos of Side “A”, Side “B”, and Side “C) and related information (e.g., context data and/or metadata) to the media platform 103 for further processing and/or storage in the media items database 113 and the context data database 115, respectively. In one embodiment, the user interface client 109 of the UEs 101 and media platform 103 interact according to a client-server model to present and/or playback a multi-channel media item (e.g., a multi-channel video). In one embodiment, the UEs 101 may include a sensor module 107*a*-107*c* (also collectively referred to as sensor modules 107) to determine context data associated with the plurality of media items (e.g., location information, timing information, orientation, etc.). The sensor modules 107 may be utilized by one or more applications (not shown for illustrative purposes) to capture media of an event 111. In one embodiment, the user interface client 109 renders the user interface of the UEs 101 based on the plurality of media channels and orientation information associated with the plurality of channels determined from the sensor modules 107. In addition, the user interface 109 renders the user interface of the UEs 101 based on the ability to use the UEs to multiplex the plurality of media channels. If the UEs 101 include a three-dimensional display screen, the user interface client 109 can also render the user interface of the UEs 101 as an object (e.g., a cube) having facets associated with the respective one or more user interface elements. In one embodiment, the system 100 has been simplified to include three UEs 101 (e.g., UE 101*a*-101*c*) to record and/or capture media items/files on the event 111, however, it is contemplated that any number of UEs 101 can be utilized in capturing information about the event 111. By way of example, a single UE 101 may also be used to capture a portion of an event (e.g., Side “A”) and then later that same UE 101 may be used to capture a portion of the same event (e.g., Side “X” apart from Side “A”) or even a different event. The media platform 103 can then determine to generate two media channels corresponding to the viewpoints “A” and “X”, respectively, in the same manner the media platform 103 would generate a plurality of media channels corresponding to Sides “A”, “B”, and “C”.

In one example embodiment, when the plurality of media items is captured by the UEs 101, related context data (e.g., metadata) is also simultaneously generated for example from the sensor modules 107 within the UEs 101 and the context data can then be determined and associated with the plurality of media items by the media platform 103 or by the UEs 101 themselves. By way of example, the context data associated with the plurality of media items can include time information, a position (Pi) of the UEs 101, an altitude (Ai) of the UEs 101, a tilt (Ti) of the UEs 101, an orientation/angle (Oi) of the UEs 101, a zoom level (Zi) of the camera lens of the UEs 101, a focal length (Fi) of the camera lens of the UEs 101, a field of view (FOVi) of the camera lens of the UEs 101, a radius of interest (RadiusOIi) of the UEs 101 while capturing the media content, a range of interest (RangeOIi) of the UEs 101 while capturing the media content, or a combination thereof. The position of the UEs 101 can be also be detected from one or more sensors of the UE 101 (e.g., via GPS). Further, the altitude can be detected from one or more sensors such as an altimeter and/or GPS. The tilt of the UEs 101 can be based on a reference point (e.g., a camera sensor location) with respect to the ground based on accelerometer information. Moreover, the orientation can be based on compass (e.g., magnetometer) information and may be based on a reference to north. One or more zoom levels, a focal length, and a field of view can be determined according to a camera sensor. Further, the radius of interest and/or range of interest can be determined based on one or more of the other parameters contained in parameter database 117 or another sensor (e.g., a range detection sensor).

In one embodiment, the media platform 103 may receive the plurality of media items (e.g., videos) and context data associated with the media items from the UEs 101 and then store the information in the media items database 113 and the context data database 115, respectively. Alternatively, the context data can be stored as a part of the respective media items. The media items database 113 can be utilized for collecting and storing the plurality of media items. More specifically, the media items database 113 may include a plurality of media items (e.g., videos), one or more media segments (e.g., video referring to Sides “A”, “B”, and/or “C”), one or more multi-channel media items (e.g., multi-channel video), or a combination thereof. Further, the context data database 115 may be utilized to store current and historical data about one or more events, and which media items belong to which event, media channels and/or multi-channel media items. Moreover, the media platform 103 may have access to additional historical data (e.g., historical sensor data or additional historical information about a region that may or may not be associated with events) to determine if an event is occurring or has occurred at a particular time. This feature can be useful in determining if newly uploaded media items can be associated with one or more events. In one embodiment, the media platform 103 also determines one or more parameters associated with editing, synchronizing, presenting, or a combination thereof from the one or more parameters stored in the parameter database 117. More specifically, the media platform 103, in connection with the user interface client 109, can utilize the one or more parameters stored in the parameter database 117 to generate or more multi-channel media items (e.g., a multi-channel video). The media items database 113, the context data database 115, and/or the parameter database 117 may exist in whole or part within the media platform 103, or independently.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), Near Field Communication (NFC) network, and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, mobile communication device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as “wearable” circuitry, etc.).

By way of example, the UEs 101 and the media platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the user interface client 109 of the UEs 101 and the media platform 103 interact according to a client-server model. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2A:
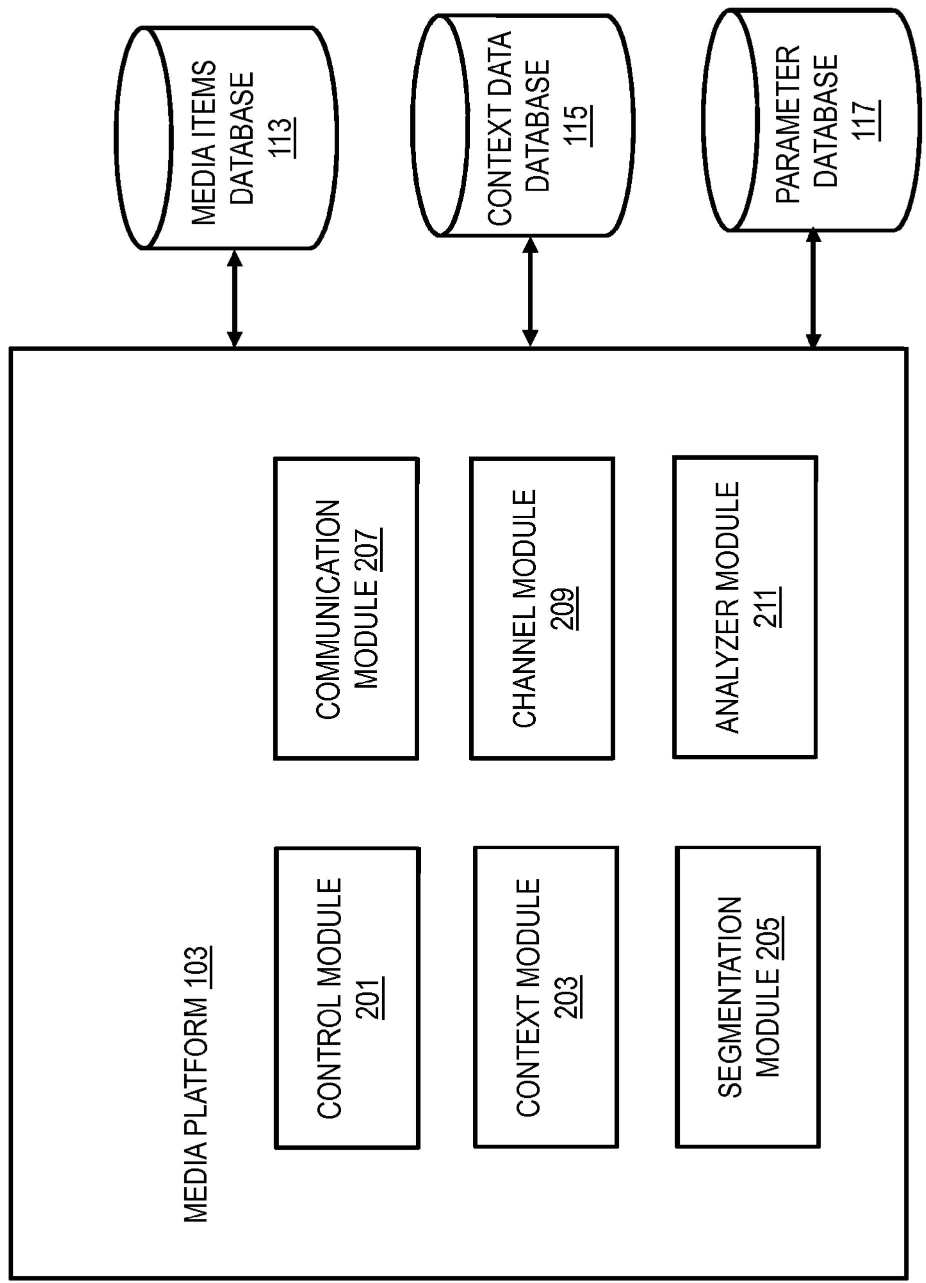
FIGS. 2A and 2B are diagrams of the components of a media platform and a user interface client, respectively, according to one example embodiment.

FIG. 2A is a diagram of the components of a media platform 103, according to one example embodiment of the invention. By way of example, the media platform 103 includes one or more server side components for providing generation of multi-channel video. It is contemplated that the functions of these components may be combined in one or more components or performed by other components of equivalent functionality. In this embodiment, the media platform 103 includes a control module 201, a context module 203, a segmentation module 205, a communication module 207, a channel module 209, and an analyzer module 211.

The control module 201 executes at least one algorithm for executing functions of the media platform 103. For example, the control module 201 may execute an algorithm for processing a request from a UE 101 (e.g., a mobile phone) to upload a plurality of media items (e.g., videos) captured at an event (e.g., a concert) by the UE 101. By way of another example, the control module 201 may execute an algorithm to interact with the context module 203 to determine the context or situation of the UEs 101 and/or the plurality of media items captured by the UEs 101 (e.g., location, orientation, timing, etc.). The control module 201 also may execute an algorithm to interact with the segmentation module 205 to cause a segmentation of the plurality of media items into one or more media segments based on a plurality of viewpoints (e.g., Side "A", Side "B", and Side "C"). The control module 201 may also execute an algorithm to interact with the communication module 207 to communicate among the media platform 103, the UEs 101 including the sensor modules 107 and the one or more applications (not shown for illustrative purposes), the media items database 113, the context data database 115, and the parameter database 117. The control module 201 also may execute an algorithm to interact with the channel module 209 to generate a plurality of media channels for respective one or more plurality of viewpoints (e.g., channel "A" for Side "A", channel "B" for Side "B", and channel "C" for Side "C"). The control module 201 may also execute an algorithm to interact with the analyzer module 211 to determine a first frame of the one or more media segments, synchronize the one or more media segments and/or the plurality of media channels, and edit the one or more media segments within the plurality of media channels. The control module 201 also may execute an algorithm to interact with the user interface client 109 to cause the user interface client 109 to render a user interface for presenting the multi-channel media item (e.g., a multi-channel video) on a device based on the viewpoints with two-dimensional and/or three-dimensional display capabilities (e.g., a mobile device, a pico projector, or a combination thereof).

In one embodiment, the context module 203 may determine context data (e.g., metadata) from built-in sensors associated with the personal recording devices (e.g., a mobile phone, a camcorder, a digital camera, etc.) used by one or more users to capture the plurality of media items (e.g., videos) of an event (e.g., a concert) and then uploaded to one or more databases. By way of example, the context data can be generated by one or more sensors built-in to the personal recording devices (e.g., an orientation sensor, an accelerometer, a timing sensor, GPS, etc.). More specifically, the context data associated with the media can include information related to the capture of the plurality of media items such as time, position, altitude, tilt, orientation, zoom, focal length, field of view, radius of interest, range of interest, or a combination thereof. The context module 203, in connection with the analyzer module 211, may be used to determine a region of interest (e.g., Side "A") for an event (e.g., a concert) as well as a plurality of viewpoints (e.g., Side "A", Side "B", and Side "C") using the region of interest as a reference point. In one embodiment, the context module 203 may also be used to determine the plurality of viewpoints based on one or more ordinal directions from a central viewpoint (e.g., left, right, up, down, front, back, or a combination thereof). The context module 203, in connection with the communication module 207, may communicate the number and orientation of the viewpoints to the user interface client 109. In one example embodiment, context module 203, in connection with the analyzer module 211, can utilize a focus point analysis to determine the viewpoints or areas of interest, wherein multiple viewpoints are determined based on groupings of multiple focus points. Further, the context module 203, in connection with the channel module 209 and analyzer module 211, may be used to generate a plurality of media channels based on the viewpoints determined for an event (e.g., Side "A", Side "B", and Side "C"), synchronize one or more media segments and/or a plurality of media channels, and/or edit the one or more media segments within the media channels.

In one embodiment, the segmentation module 205 causes a segmentation of the plurality of media items uploaded and stored in one or more databases into one or more media segments based on which viewpoint of an event a particular media item refers to (e.g., Side "A", Side "B", or Side "C"). By way of example, a media item can refer to a particular viewpoint of the event when a user directs his or her recording device (e.g., a mobile phone) in that direction (e.g., towards Side "A").

The communication module 207 is used for communication between the media platform 103, the sensor modules 107, the one or more applications, the media items database 113, the context data database 115, and the parameter database 117. The communication module 207 may be used to communicate commands, requests, data, etc. By way of example, the communication module 207 may be used to transmit a plurality of media items captured by a mobile device (e.g., a mobile camera) at an event (e.g., a concert) and the context data associated with the media items to the media items database 113 and the context data database 115, respectively. In one embodiment, the communication module 207 is used to transmit the plurality of media items and associated context data from the one or more databases to the context module 203 and segmentation module 205 in order to begin the process of segmenting the plurality of media items into one or more media segments based on a plurality of viewpoints of the event. The communication module 207 may also be used in connection with the user interface client 109 to determine an input for selecting a subset of the plurality of media channels for presentation, when applicable, and/or causing a presentation and/or playback of the multi-channel media item (e.g., a multi-channel video) on one or more displays.

The channel module 209, in connection with the context module 203 and segmentation module 205, is used to generate a media channel (e.g., a video channel) corresponding to each viewpoint (e.g., Side "A") determined by the context module 203 for an event (e.g., a concert). In one embodiment, the channel module 209 may be used to generate multiple media channels corresponding to multiple events. The channel module 209, in connection with the analyzer module 211, may also be used to compile the one or more media segments generated by the segment module 205 and associate the one or more segments with a respective media channel. By way of example, after the segmentation module 205 segments a plurality of media items based on a region of interest and/or a plurality of viewpoints of an event (e.g., Side "A", Side "B", and Side "C"), the channel module 209 may be used to generate corresponding channels (e.g., "A", "B", and "C") and then compile the one or more media segments corresponding to each viewpoint, each media channel, or a combination thereof. In addition, the channel module 209 may generate the plurality of media channels so that each media channel may have a different synchronization criterion. Moreover, the channel module 209 may be used to generate a synchronization channel between the plurality of media channels which, in one example, is called the track synchronization and mux channel. In addition, the channel module 209 may generate a multi-channel media item (e.g. a multi-channel video) by combining multiple media channels under one media item or video stream as a synchronized presentation.

The analyzer module 211 is used to determine the first frame of each media segment corresponding to a media channel. By way of example, the analyzer module 211 may determine the first frame of a media segment based on either the timing information associated with the media segment and/or, when applicable, the audio information associated with the media segment. In one embodiment, the analyzer module 211 may be used to automatically edit the one or more media segments associated with a media channel (e.g., "A") based on one or more parameters contained within the parameter database 117. By way of example, in the case of a music event, the analyzer module 211 can edit the one or more media segments based on beats per minute (bpm) of the audio portion of the media segment, quality of one or more media segments, quality of the audio portion of the one or more media segments, one or more significant events within the media segments (e.g., at Side "A"), the duration of the media segments, and so forth. In one embodiment, the analyzer module 211 may be used to exchange one or more media segments within a media channel if the one or more segments fail to meet a threshold value associated with one or more parameters. In addition, the analyzer module 211 also may be used to synchronize the plurality of media channels (e.g., "A", "B", and "C") associated with the determined region of interest and corresponding viewpoints (e.g., Side "A", Side "B", and Side "C") of an event (e.g., a concert). In one embodiment, the analyzer module 211 may be used to replace one or more media segments within a media channel based on the number of display screens.

Figure 2B:
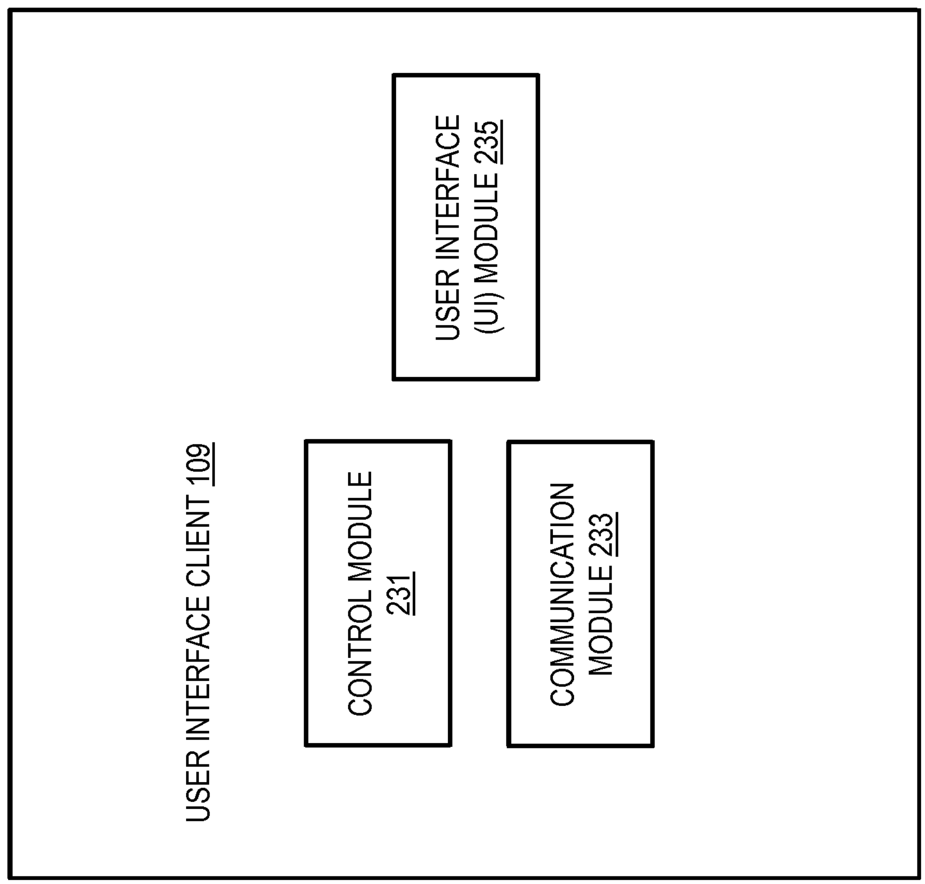

FIG. 2B is a diagram of the components of the user interface client 109, according to one example embodiment of the invention. By way of example, the user interface client 109 includes one or more client side components for providing generation of multi-channel video. It is contemplated that the functions of these components may be combined in one or more components or performed by other components of equivalent functionality. In this embodiment, the user interface client 109 includes a control logic 231, a communication module 233, and a user interface (UI) module 235.

Similar to the control logic 201 of the media platform 103, the control module 231 oversees the tasks, including tasks performed by the communication module 233, and the user interface (UI) module 235. For example, although the other modules may perform the actual task, the control logic 231 may determine when and how these tasks are preformed or otherwise direct the other modules to perform the task.

Similar to the communication module 207 of the media platform 103, the communication module 233 is used for communication between the media platform 103 and the user interface client 109 of the UEs 101. The communication module 233 may be used to communicate commands, requests, data, etc. More specifically, the communication module 233 is used for communication between the communication module 207 of the media platform 103 and the user interface module 235.

The user interface (UI) module 235 interacts with the media platform 103 in a client-server relationship to cause a rendering of a user interface for presenting the multi-channel media item (e.g., a multi-channel video). More specifically, in one embodiment, the user interface module 235 may be used to render a user interface that includes one or more selectable user interface elements representing respective media channels (e.g., "A", "B", "C") and respective orientation information associated with each channel (e.g., Side "A", Side "B", and Side "C"). By way of example, the user interface module 235 may be used to enable the user to select or determine which one or more media channels to present and/or playback and in which order. The user interface module 235 may also be used to provide a user with the option to present and/or playback the track synchronization and mux channel as opposed to an individual media channel. In one embodiment, the user interface module renders the user interface elements relative to the plurality of media channels as well the orientation information associated with the plurality of media channels. In one embodiment, the number, position, and size of the viewpoints may change during the presentation of the multi-channel media item because the focus points and/orientations of the captured media items may change during a timespan of the multi-channel media item presentation. In this instance, the user interface module 235, may change the rendering of the user interface according to the change in the number, position, and size of the viewpoints. By way of example, a user can use the user interface module 235 to present and/or playback one or more media channels and/or viewpoints or the track synchronization and mux channel. An illustrative example of a two-dimensional user interface rendered by the user interface module 235 is shown in FIG. 5.

In another example embodiment, when the user interface module 235 determines that the display screen associated with the UEs 101 consists of a three-dimensional display, the user interface module 235 may be used to enable a user to orient and/or move a user interface in three-dimensions to view different media channels. By way of example, the user interface module 235 may be used to render a user interface consisting of a cube for a multi-channel media item consisting of six channels, a pyramid for a multi-channel media item consisting of five channels, or an object determined by a user based on the same concept of associating one or more user interface elements and one or more media channels. In this example, a user can use a gesture relative to the cube interface to cause the user interface module 235 to rotate the UI and/or select one or more corresponding media channels to render. In another example embodiment, if the area of event is three dimensional also relative height of viewpoints can be considered to create three-dimensional viewpoints that can be presented, for example, as cubes or blocks in a three-dimensional UI presentation.

Figure 7:
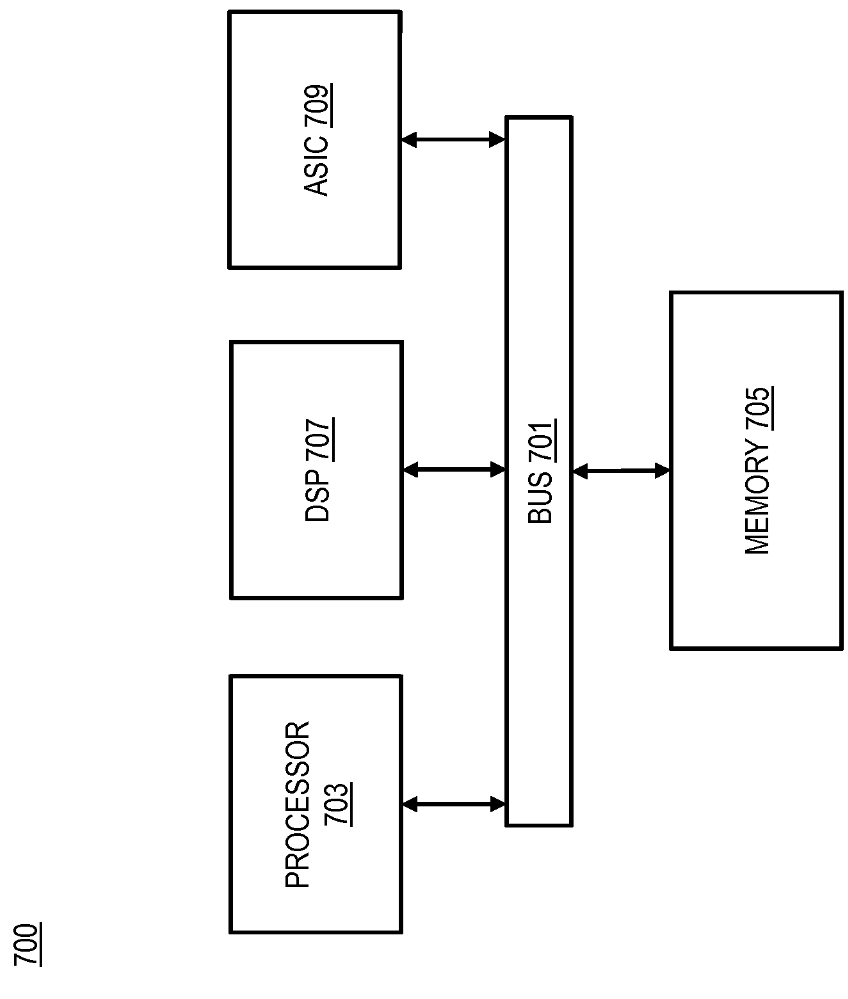
FIG. 7 is a diagram of a chip set that can be used to implement an example embodiment of the invention.

FIGS. 3 and 4 are flowcharts of processes for generating multi-channel video, according to one embodiment. FIG. 3 depicts a process 300 of generating a framework for creating multi-channel media (e.g., multi-channel video). In one embodiment, the media platform 103 performs the process 300 and is implemented in, for instance, a chip set including a processor and a memory as shown in FIG. 7. In step 301, the media platform 103 causes, at least in part, a generation of a plurality of media channels for respective one or more of the plurality of viewpoints, wherein the plurality of media channels compile one or more media segment that depict the respective one or more of the plurality of viewpoints. In one embodiment, rather than combining the one or more media segments associated with viewpoints Side "A", Side "B", and Side "C" into a single stream or file, the media platform 103 generates a plurality of media channels (e.g., video channels) for each respective viewpoint. By way of example, in this instance, the media platform 103 generates three media channels "A", "B", and "C" for each of the viewpoints Side "A", Side "B", and Side "C", respectively. In one embodiment, the media platform 103 then compiles the one or more media segments referencing the viewpoints Side "A", Side "B", and Side "C" into the respective channels "A", "B", and "C".

In step 303, the media platform 103 causes, at least in part, a compilation of the plurality of media channels into a multi-channel media item, for example based on even related metadata, such as time/date, location, name of event, etc. By way of example, the media platform 103 preserves the integrity of each media channel determined for the respective viewpoints in a multi-channel media item (e.g., a multi-channel video) rather than compress or compile the multiple sources into a single media stream. More specifically, once the media platform 103 compiles a plurality of media channels into a multi-channel media item, the media platform 103 may then present and/or playback each of the plurality of media channels on a different display screen and/or present and/or playback the plurality of media channels on a single display screen. In either instance, the media platform 103 is able to generate a full-fidelity and/or immersive video representation of the event.

In step 305, the media platform 103 causes, at least in part, a segmentation of a plurality of media items into the one or more media segments based, at least in part, on a plurality of viewpoints of at least one event. In one embodiment, the plurality of media items is determined by the media platform 103 from individual users recording and/or capturing media (e.g., video, audio, images, etc.) at an event (e.g., a concert) using their one or more personal recording devices (e.g., a mobile phone, a camcorder, a digital camera, etc.) and later uploading the plurality of media items with respective context data (such as metadata) to one or more services that are capable of processing and/or storing the plurality of media items. By way of example, an event (e.g., a concert) may have a center stage (Side "A"), a left stage (Side "B"), and a right stage (Side "C"). In one example, the various stages and/or views of the various stages represent a plurality of viewpoints of the event. In one embodiment, the media platform 103 segments the plurality of media items based, at least in part, on the side or viewpoint that the one or more segments within the plurality of media item (e.g., a video) refers to (e.g., Side "A", Side "B", or Side "C"), which the media platform 103 determines from the plurality of media items, context data (e.g., metadata) associated with the plurality of media items, or a combination thereof.

In step 307, the media platform 103 processes and/or facilitates a processing of the plurality of media items associated with the at least one event, context data associated with the plurality of media items, or a combination thereof to determine at least one region of interest for the at least one event, wherein the plurality of viewpoints is determined with the at least one region of interest as at least one reference point, or alternative one region of interest can be directly defined as a viewpoint. As previously discussed, in one example, an event (e.g., a concert) may have a center stage (Side "A"), a left stage (Side "B"), and a right state (Side "C") and the users at the event may have corresponding viewpoints of the stages (e.g., viewpoints "A", "B", and "C", respectively). In one embodiment, the media platform 103 first determines one or more region of interests (e.g., viewpoint "A") based on an analysis of the plurality of media items (e.g., videos), context data associated with the media items (e.g., focus analysis based on the position (Pi) of the UEs 101, altitude (Ai) of the UEs 101, tilt (Ti) of the UEs 101, orientation/angle (Oi) of the UEs 101, zoom level (Zi) of the camera lens of the UEs 101, focal length (Fi) of the camera lens of the UEs 101, field of view (FOVi) of the camera lens of the UEs 101, radius of interest (RadiusOIi) of the UEs 101 and/or range of interest (RangeOIi)), or a combination thereof associated with the event. In other words, the media platform 103 determines from a majority of media items (e.g., videos) taken by users at the event which region or viewpoint of the event the majority of users were focused on (i.e., the region of interest). The media platform 103 then determines a plurality of viewpoints of the event (e.g., viewpoints "B" and "C") based on the region of interest (e.g., viewpoint "A") as the at least one reference point.

In step 309, the media platform 103 optionally determines to designate the at least one region of interest as a central viewpoint. As previously discussed, the media platform 103 determines a region of interest (e.g., viewpoint "A") based on the viewpoints of a majority of users recording and/or capturing an event (e.g., a concert) as the central point and then determines a plurality of viewpoints of the event (e.g., viewpoints "B" and "C") based on the region of interest (e.g., viewpoint "A") as the at least one reference point.

In step 311, the media platform 103 optionally determines to designate the plurality of viewpoints based on one or more ordinal directions from the central viewpoint, wherein the one or ordinal directions include, at least in part, left, right, up, down, front, back, or a combination thereof. In one embodiment, in addition to visual clues, the media platform 103 may determine the plurality of viewpoints based on audio analysis.

FIG. 4 depicts a process 400 of synchronizing, editing, and/or presenting a plurality of media channels (e.g., video channels) associated with at least one event (e.g., a concert). In one embodiment, the media platform 103 performs the process 400 and is implemented in, for instance, a chip set including a processor and a memory as shown in FIG. 7. In step 401, the media platform 103 determines an input for selecting a subset of the plurality of media channels. By way of example, in the case that a single channel playback is required because of the capabilities of a media player or the lack of multiple display screens, a user may determine to present and/or playback one or more channels of the compiled multi-channel media item (e.g., channel "A"), or a user may determine to present and/or playback a multiplex of the one or more media segments from among the plurality of media channels (e.g., channels "A", "B", "A", "C", "A"), or a user may determine to present and/or playback a track synchronization and mux channel that already contains the plurality of channels (e.g., channels "A", "B", and "C") synchronized into a single channel by the media platform 103 for this specific purpose.

In step 403, the media platform 103 causes, at least in part, a multiplexing of the subset into a single channel for presentation. As previously discussed, when a single channel playback or presentation is required, the media platform 103 may be used to generate a synchronization channel between the plurality of media channels (e.g., channels "A", "B", and "C"). More specifically, in one embodiment, the media platform 103 generates a track synchronization and mux (i.e., multiplex) channel. By way of example, the track synchronization and mux channel provides information on frame or media segment synchronization between the different tracks or media channels so that one or more frames or media segments within the one or more tracks or media channels can be replaced by the media platform 103 with one or more frames or media segments from within one or more other media channels to get a full edit feel from a single media channel.

In step 405, the media platform 103 causes, at least in part, a synchronization of the plurality of channels, wherein the compilation of the multi-channel media item is based, at least in part, on the synchronization. In one embodiment, the media platform 103 synchronizes the plurality of channels within the compilation of the multi-channel media item (e.g., multi-channel video) so that when the one or more media channels are presented and/or played back (e.g., each on a different screen) the media platform 103 is able to present to one or more users a full-fidelity and/or immersive representation of the event. By way of example, the synchronization of the plurality of channels within the multi-channel media item is analogous to multi-channel surround. In one embodiment, each media channel created by the media platform 103 can have its own synchronization criterion, but in most cases, the plurality of media channels begins and ends at the same time.

In step 407, the media platform 103 synchronizes the plurality of channels, wherein the synchronization is based, at least in part, on timing information, sensor information, media quality information, one or more audio cues, one or more visual cues, or a combination thereof associated with the plurality of media items, the one or more media segments, the at least one event, or a combination thereof. By way of example, in the same way that the media platform 103 synchronizes the plurality of media segments within a respective media channel, the media platform 103 may also synchronize the plurality of media channels to compile a multi-channel media item (e.g., a multi-channel video). In one embodiment, the criterion used by the media platform 103 to synchronize the plurality of media channels is based, at least in part, on the type of event captured by the users. For example, in the case of a musical event (e.g., a concert), the media platform 103 may determine to synchronize one or more media channels based on timing information, audio clues, and/or visual clues associated with a channel. This way, the user can select any of the media channels/viewpoints for presentation so that audio/soundtrack is seamless between the channels even the audio/soundtrack is played from the selected channel. More specifically, the media player 103 may determine not to playback and/or present the channel representing the left side of the stage (e.g., channel "B") until the media platform 103 determines from the one or more media segments that there is some noteworthy activity occurring with respect to viewpoint "B". In other words, a display screen on the left side might remain blank at first and then come up as the activity on the stage involves the left side of the stage.

In step 409, the media platform 103 determines synchronization criteria for the synchronization, wherein the synchronization criteria, one or more synchronization start times, one or more synchronization end times, or a combination thereof are different for respective ones of the plurality of channels. As previously discussed, the media platform 103 may generate each media channel based on a different synchronization criterion, but in most cases the media platform 103 will start and end the media channels at the same time. It is contemplated that synchronizing the media channels in this manner will often enable the media platform 103 to present and/or display the multi-channel media item (e.g., a multi-channel video) in manner most faithful to the actual event. In the example just mentioned, however, the media platform 103 may determine not to synchronize the start of two or more media channels based on the fact that a media channel associated with a viewpoint contains an absence of activity. In another example, a user may determine to stagger the synchronization of one or more media channels for dramatic effect.

In step 411, the media platform 103 determines one or more editing parameters for compiling the one or more media segments in the plurality of media channels based, at least in part, on one or more characteristics of (a) the at least one event, (b) the plurality of media items, (c) the one or more media segments, or (d) a combination thereof. By way of example, as previously discussed, the media platform 103 first determines a first frame for each media segment which can be based on either the timing information associated with the media segment or on a synchronization of the audio associated with the media segment depending on the event. In one embodiment, once the media platform 103 determines the first frame for each media segment, the media platform 103 then automatically edits the one or more media segments within each media channel based on one or more defined parameters. More specifically, the editing parameters are determined by the media platform 103 based on one or more characteristics related to the event, the media, the one or more media segments, or a combination thereof. By way of example, in the case of a music event (e.g., a concert) the parameters determined by the media platform 103 may include beats per minute (bpm) of an audio portion of the one or more media segments, quality of the one or more segments available, quality of the audio channels associated with the one or more media segments, significant events happening within a particular viewpoint (e.g., Side "A"), length of the one or more media segments, and so forth. In one embodiment, the media platform 103 can determine to substitute one or more media segments within a media channel with one or more media segments from the same user or a different user if the one or more media segments fall outside a threshold value associated with the one or more parameters.

In step 413, the media platform causes, at least in part, a rendering of a user interface for presenting the multi-channel media item, wherein the user interface includes, at least in part, one or more user interface elements representing respective one or more of the plurality of media channels; and wherein the one or more user interface elements include, at least in part, one or more objects with facets associated with the respective one or more user interface elements. By way of example, the media platform 103 can render one or more user interface elements based on the orientation information and number of channels associated with a multi-channel media item. More specifically, the media platform 103 can render a user interface element "A" in the center of the user interface, a user interface element "B" on the left side of the user interface, and a user interface "C" on the right side of the display. An illustrative depiction of this example is shown in FIG. 5. As a result, a user can start the presentation and/or playback of media channel "A" by touching or activating user interface element "A" and so forth. In one embodiment, the media platform 103 may be used to provide a user with the option to present and/or playback the track synchronization and mux channel as opposed to one or more media channels.

In another embodiment, when the display screen and/or user interface (UI) for the multi-channel media item consists of a three-dimensional display, the media platform 103 may be used to enable a user to orient and/or move the UI in three-dimensions to view one or more media channels. By way of example, the media platform 103 may be used to render a user interface consisting of a cube for a multi-channel media item consisting of six channels, a pyramid for a multi-channel media item consisting of five channels, or an object determined by a user based on the same concept of associating one or more user interface elements with one or more media channels. In this example, a user can use a gesture referencing the cube interface to cause the media platform 103 to rotate the UI and/or select one or more corresponding media channels to render.

In step 415, the media platform 103 causes, at least in part, a rendering of a user interface, wherein the user interface is presented on a device with multiple display capabilities including, at least in part, one or more display screens, one or more projectors, or a combination thereof. By way of example, the media platform 103 may be used to render a user interface for presenting the multi-channel media item (e.g., a multi-channel video) on a mobile device (e.g., a pico projector). In one example the mobile device may be equipped with multiple projecting lenses or pico projectors (e.g., three lenses corresponding to media channels "A", "B", and "C"). The advantage of multiple display screens is that each channel can be presented and/or played back separately and simultaneously on a different display screen creating a full-fidelity and/or immersive experience for one or more users.

FIG. 5 is a diagram of a two-dimensional user interface utilized in the processes of FIGS. 3 and 4, according to various example embodiments of the invention. As shown, the example user interface of FIG. 5 includes one or more user interface elements, such as the viewpoints, and/or functionalities created and/or modified based, at least in part, on information, data, and/or signals resulting from the processes (e.g., processes 300 and 400) described with respect to FIGS. 3 and 4. More specifically, FIG. 5 illustrates a user interface (e.g., interface 501) for presenting a multi-channel media item (e.g., multi-channel video) of an event (e.g., a concert) on a single two-dimensional screen. As previously discussed, the interface 501 is generated by the media platform 103 based on the context information and number of channels associated with the one or more media segments determined from a plurality of media items captured during the event. As shown in FIG. 5, a user is able to touch or select one or more sides of the stage (e.g., Side "A" 503, Side "B" 505, or Side "C" 507) to determine which respective media channel is presented on one or more display screens. In addition, a user has the option to present and/or playback the track synchronization and mux channel by touching the automatic mixing element 509. In some example embodiments, the user interface can be three-dimensional, wherein the viewpoints can be presented as cubes or blocks and the whole user interface with its elements can be rotated over the three axis. In some example embodiments, the two-dimensional user interface can be overlaid on a map presentation.

The processes described herein for generating multi-channel video may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
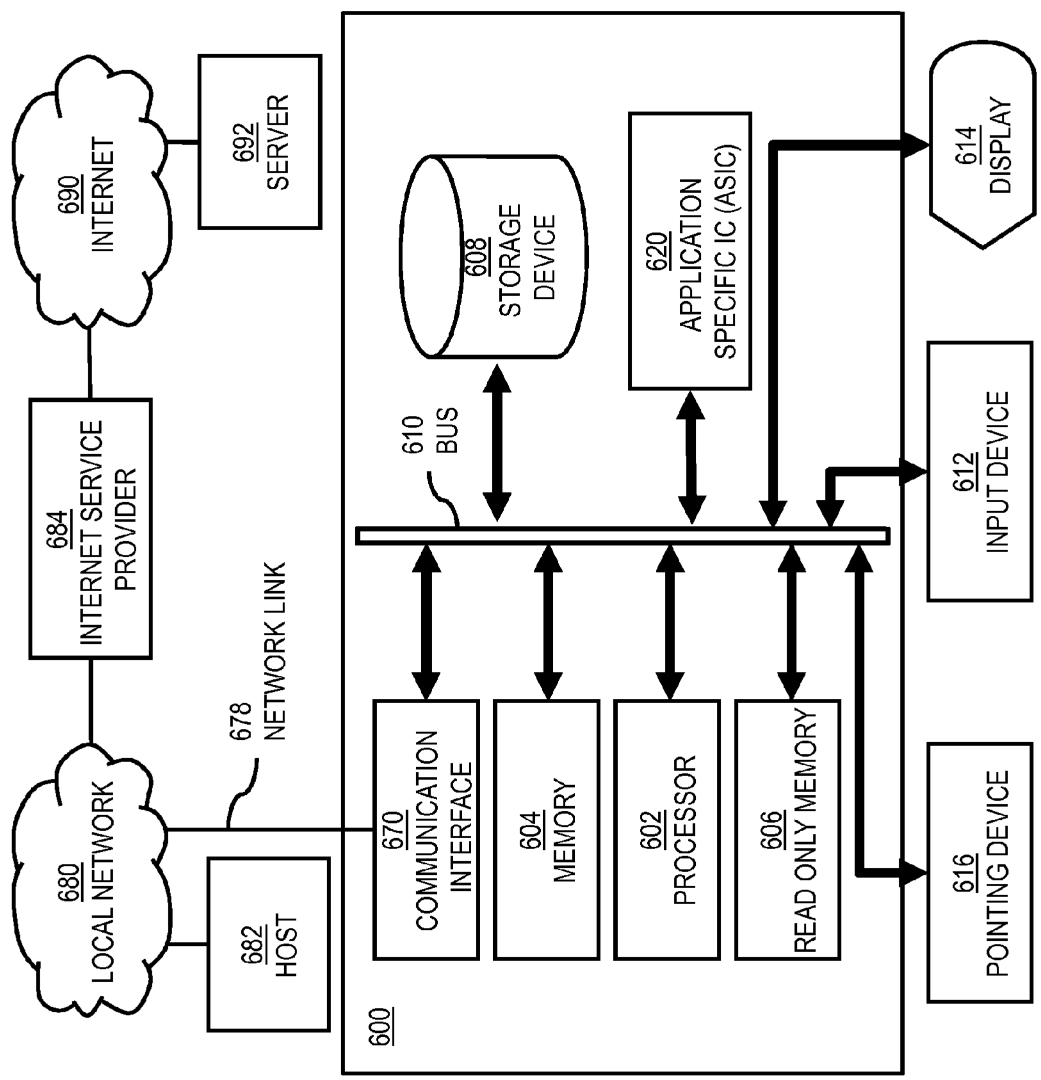
FIG. 6 is a diagram of hardware that can be used to implement an example embodiment of the invention.

FIG. 6 illustrates a computer system 600 upon which an example embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to generate multi-channel video as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of generating multi-channel video.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to generate multi-channel video. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for generating multi-channel video. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for generating multi-channel video, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for generating multi-channel video to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an example embodiment of the invention may be implemented. Chip set 700 is programmed to generate multi-channel video as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of generating multi-channel video.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to generate multi-channel video. The memory 705 also stores the data associated with or generated by the execution of the inventive steps.

Figure 8:
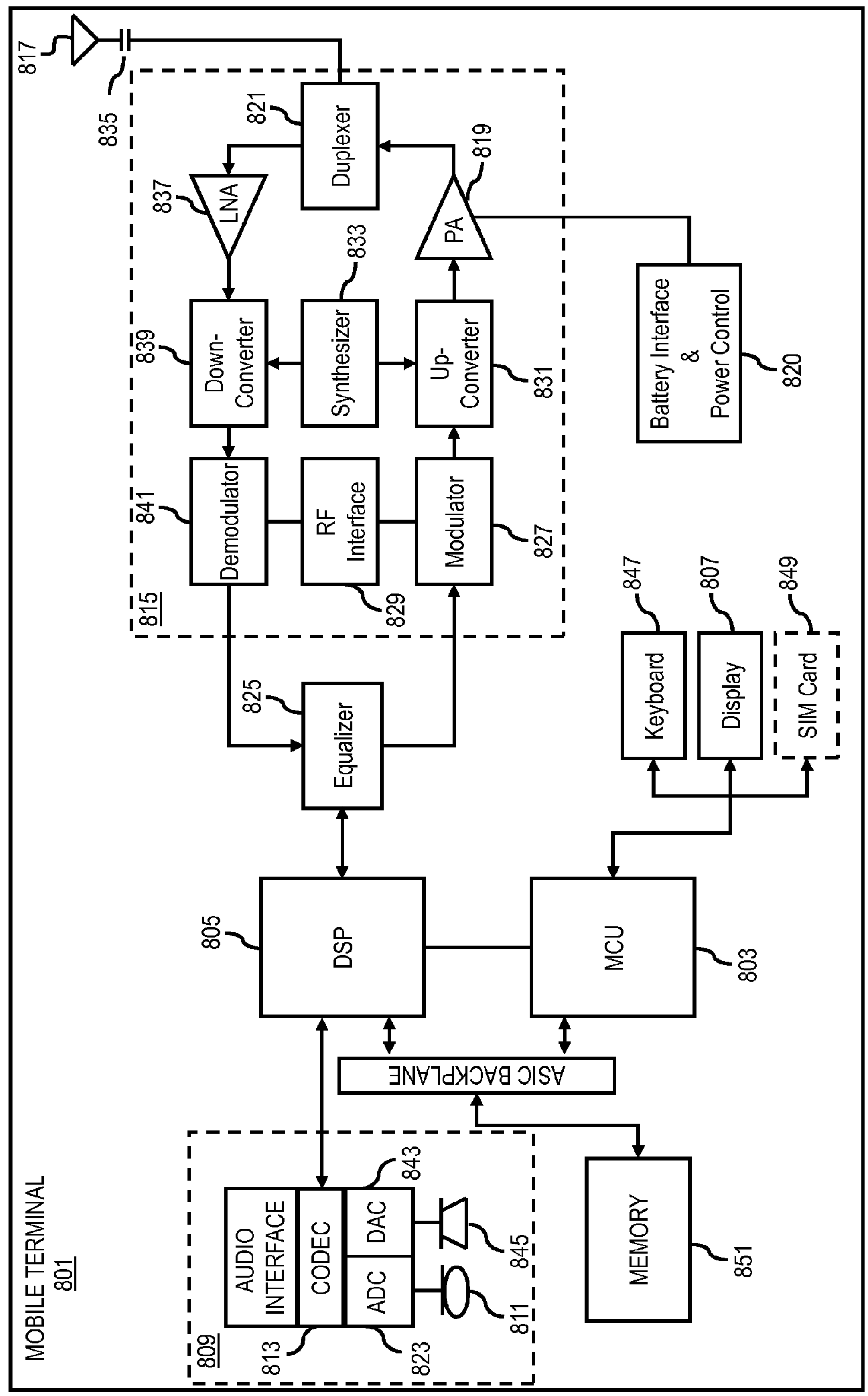
FIG. 8 is a diagram of a mobile terminal (e.g., handset) that can be used to implement an example embodiment of the invention.

FIG. 8 is a diagram of exemplary components of a mobile terminal (e.g., handset) for communications, which is capable of operating in the system of FIG. 1, according to one example embodiment of the invention. In some embodiments, mobile terminal 801, or a portion thereof, constitutes a means for performing one or more steps of generating multi-channel video. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of generating multi-channel video. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to generate multi-channel video. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

generating a plurality of media channels from a plurality of media items created via one of a plurality of user devices, each media channel being for each of a plurality of viewpoints of at least one event, and said each media channel being configured to be selected by a user for viewing on a user device, wherein the plurality of media channels compiles a plurality of media segments that depict said each of the plurality of viewpoints of the at least one event;

compiling the plurality of media channels into a multichannel media item;

processing the plurality of media items associated with the at least one event, context data associated with the plurality of media items, or a combination thereof to determine at least one region of interest for the at least one event, wherein the at least one region of interest is determined to be a region or a viewpoint of the at least one event that a majority of the plurality of media items is focused on at a time said each of the plurality of media items is created, and wherein the at least one region of interest is determined by analyzing areas of audio overlap among the one or more media segments; and rendering a user interface for presenting the multi-channel media item for the at least one event, wherein the user interface includes a plurality of user interface elements on a single screen, each user interface element representing a respective one of the plurality of media channels corresponding to a respective one of the plurality of viewpoints, and wherein two or more of the plurality of user interface elements are activated to simultaneously display the two or more media channels corresponding to the activated two or more of the plurality of user interface elements.

2. A method of claim 1, further comprising:

segmenting the plurality of media items into the plurality of media segments based, at least in part, on the plurality of viewpoints of the at least one event;

wherein the plurality of viewpoints of the at least one event is determined with the at least one region of interest as at least one reference point.

3. A method of claim 2, further comprising:

designating the at least one region of interest as a central viewpoint; and designating the plurality of viewpoints of the at least one event based on one or more ordinal directions from the central viewpoint, wherein the one or more ordinal directions include, at least in part, left, right, up, down, front, back, or a combination thereof.

4. A method of claim 1, further comprising:

selecting a subset of the plurality of media channels; and multiplexing the subset into a single channel for presentation.

5. A method of claim 1, wherein the plurality of media channels includes a same type of media, the method further comprising:

synchronizing the plurality of channels, wherein the compiling the plurality of media channels into the multi-channel media item is based, at least in part, on the synchronization.

6. A method of claim 5, wherein the synchronizing is based, at least in part, on timing information, sensor information, media quality information, one or more audio cues, one or more visual cues, or a combination thereof associated with the plurality of media items, the plurality of media segments, the at least one event, or a combination thereof.

7. A method of claim 5, further comprising:

determining synchronization criteria for the synchronizing, wherein the synchronization criteria, one or more synchronization start times, one or more synchronization end times, or a combination thereof are different for respective ones of the plurality of channels.

8. A method of claim 1, further comprising:

determining a plurality of editing parameters for compiling the plurality of media segments in the plurality of media channels based, at least in part, on a plurality of characteristics of (a) the at least one event, (b) the plurality of media items, (c) the plurality of media segments, or (d) a combination thereof.

9. An apparatus comprising:

at least one processor; and at least one non-transitory memory carrying one or more sequences of one or more instructions which, when executed by the at least one processor, cause the apparatus to perform at least following, cause, at least in part, a generation of a plurality of media channels from a plurality of media items created via one of a plurality of user devices, each media channel being for each of a plurality of viewpoints of at least one event, and said each media channel being configured to be selected by a user for viewing on a user device, wherein the plurality of media channels compiles a plurality of media segments that depict said each of the plurality of viewpoints of the at least one event;

cause, at least in part, a compilation of the plurality of media channels into a multi-channel media item;

process and/or facilitate a processing of the plurality of media items associated with the at least one event, context data associated with the plurality of media items, or a combination thereof to determine at least one region of interest for the at least one event, wherein the at least one region of interest is determined to be a region or a viewpoint of the at least one event that a majority of the plurality of media items is focused on at a time said each of the plurality of media items is created, and wherein the at least one region of interest is determined by analyzing areas of audio overlap among the one or more media segments; and rendering a user interface for presenting the multi-channel media item for the at least one event, wherein the user interface includes a plurality of user interface elements on a single screen, each user interface element representing a respective one of the plurality of media channels corresponding to a respective one of the plurality of viewpoints, and wherein two or more of the plurality of user interface elements are activated to simultaneously display the two or more media channels corresponding to the activated two or more of the plurality of user interface elements.

10. An apparatus of claim 9, wherein the apparatus is further caused to:

cause, at least in part, a segmentation of the plurality of media items into the plurality of media segments based, at least in part, on the plurality of viewpoints of the at least one event;

wherein the plurality of viewpoints of the at least one event is determined with the at least one region of interest as at least one reference point.

11. An apparatus of claim 10, wherein the apparatus is further caused to:

determine to designate the at least one region of interest as a central viewpoint; and determine to designate the plurality of viewpoints of the at least one event based on one or more ordinal directions from the central viewpoint, wherein the one or more ordinal directions include, at least in part, left, right, up, down, front, back, or a combination thereof.

12. An apparatus of claim 9, wherein the apparatus is further caused to:

determine an input for selecting a subset of the plurality of media channels; and cause, at least in part, a multiplexing of the subset into a single channel for presentation.

13. An apparatus of claim 9, wherein the plurality of media channels includes a same type of media, and wherein the apparatus is further caused to:

cause, at least in part, a synchronization of the plurality of channels, wherein the compilation of the plurality of media channels into the multi-channel media item is based, at least in part, on the synchronization.

14. An apparatus of claim 13, wherein the synchronization is based, at least in part, on timing information, sensor information, media quality information, one or more audio cues, one or more visual cues, or a combination thereof associated with the plurality of media items, the plurality of media segments, the at least one event, or a combination thereof.

15. An apparatus of claim 13, wherein the apparatus is further caused to:

determine synchronization criteria for the synchronization, wherein the synchronization criteria, one or more synchronization start times, one or more synchronization end times, or a combination thereof are different for respective ones of the plurality of channels.

16. An apparatus of claim 9, wherein the apparatus is further caused to:

determine a plurality of editing parameters for compiling the plurality of media segments in the plurality of media channels based, at least in part, on one or more characteristics of (a) the at least one event, (b) the plurality of media items, (c) the plurality of media segments, or (d) a combination thereof.

17. A method of claim 1, wherein each of the plurality of channels carries a same type of media, the method further comprising:

synchronizing the plurality of channels to begin at a same time, end at a same time, or a combination thereof.

18. An apparatus of claim 9, wherein each of the plurality of channels carries a same type of media, and wherein the apparatus is further caused to:

cause, at least in part, a synchronization the plurality of channels to begin at a same time, end at a same time, or a combination thereof.

* * * * *